(12) United States Patent
Bohnker

(10) Patent No.: US 7,464,808 B2
(45) Date of Patent: Dec. 16, 2008

(54) GRIPPING INTAKE SYSTEM FOR DUAL BELT CONVEYOR

(76) Inventor: John Bohnker, 102 Hannah Cir., Underwood, IA (US) 51576

( * ) Notice: Subject to any disclaimer, the term of this patent is extended or adjusted under 35 U.S.C. 154(b) by 0 days.

(21) Appl. No.: 11/809,770

(22) Filed: Jun. 1, 2007

(65) Prior Publication Data

US 2007/0289846 A1 Dec. 20, 2007

Related U.S. Application Data

(60) Provisional application No. 60/813,423, filed on Jun. 14, 2006.

(51) Int. Cl.
*B65G 15/20* (2006.01)
(52) U.S. Cl. ............... 198/626.6; 198/626.2; 198/626.5
(58) Field of Classification Search .................. 198/607, 198/626.1, 626.2, 626.3, 626.4, 626.5, 626.6, 198/819
See application file for complete search history.

(56) References Cited

U.S. PATENT DOCUMENTS

| | | | | |
|---|---|---|---|---|
| 4,073,378 A | * | 2/1978 | Bertram et al. | .......... 198/626.6 |
| 4,776,450 A | * | 10/1988 | Schwing et al. | .......... 198/626.2 |
| 4,936,441 A | * | 6/1990 | Akesaka | .................. 198/626.2 |
| 5,632,370 A | * | 5/1997 | Grathoff | ..................... 198/607 |
| 6,484,870 B2 | * | 11/2002 | Bohnker et al. | .......... 198/626.2 |

* cited by examiner

*Primary Examiner*—James R Bidwell

(57) ABSTRACT

A gripping intake system for a dual belt conveyor includes a hopper for storing granular material adjacent the return sections of the upper and lower loop belts of the dual belt conveyor, at least one hold down roller engaging the lower loop belt such that the upper and lower loop belts are held in spaced apart configuration prior to the conveying sections of the upper and lower loop belts being biased towards one another in face-to-face conveying relationship whereby granular material falling from the hopper comes into contact with the upper and lower loop belts which engage and accelerate the granular material via gravity and frictional contact with the belts to approximately the same speed as the belts and then feed the accelerated granular material into the dual belt conveyor.

14 Claims, 8 Drawing Sheets

GRIPPING INTAKE SYSTEM FOR DUAL BELT CONVEYOR

CROSS-REFERENCE TO RELATED PATENTS

This application claims priority based on a provisional patent, specifically on the Provisional Patent Application Ser. No. 60/813,423 filed Jun. 14, 2006.

BACKGROUND OF THE INVENTION

1. Technical Field

The present invention relates to granular material feed devices for conveyor belt systems and, more particularly, to a gripping intake system for a dual belt conveyor which includes a hopper for storing granular material adjacent the return sections of the upper and lower loop belts of the dual belt conveyor, a tail roller engaging the upper loop belt between the return section and the conveying section, at least one hold down roller engaging the lower loop belt between the return section and the conveying section such that the upper and lower loop belts are held in spaced apart configuration prior to the conveying sections of the upper and lower loop belts being biased towards one another in face-to-face conveying relationship whereby granular material falling from the hopper comes into contact with the upper and lower loop belts which engage the granular material, accelerate the granular material via gravity and periodic engagement of the granular material with at least one of the upper and lower loop belts and the adjacent accelerated granular material to approximately the same speed as the belts and then feed the accelerated granular material into the dual belt conveyor whereby the granular material is more efficiently fed into the face-to-face conveying relationship section of the dual belt conveyor.

2. Description of the Prior Art

Dual belt conveyor systems similar to U.S. Pat. No. 6,484,870 issued to Bohnker et al. work well to carry granular product up steeper inclines than the angle of repose of that particular product. Once product is squeezed between the two belts, product is conveyed very effectively. However, the intake of the conveyor has proven to be troublesome due to the fact that the conveyor is typically set at an angle which is greater than the angle of repose and a method must be designed to throw product between the belts for the dual belt system to be successful. Currently, there are designs that have been used to transfer product into the dual belts with some success. However, these designs have application restrictions that limit the use of the dual belt system.

An example of one of the current designs is a Horizontal Feeder Conveyor, such as that shown in FIG. 7, which is used to accelerate the product so it can be thrown between dual belts in the conveyor. Disadvantages of this method are:

1. Requires an additional conveyor with an additional drive process.
2. Complicates conveyor as feeder conveyor needs to remain nearly horizontal even as dual belt conveyor increases in angle.
3. Controlling 100% of the granular product is difficult when product is "thrown" into dual belts.
4. Successful application of dual belt conveyor is limited with need of additional feeder conveyor.
5. Making the Dual Best Conveyor portable is complicated as the feeder conveyor changes the center of gravity of the total conveyor. Also, the feeder conveyor pivots independently from the dual belt conveyor, thus the center of gravity is not fixed.
6. Transmitting drive power from the front tail of the conveyor is extremely difficult with the pivoting feeder conveyor in place. Front power drive is of value to enable the conveyor to be portable for some applications.

Another example is the Elongated and Fixed Leg of Bottom Belt design, which is shown best in FIG. 8, which includes an elongated and fixed bent leg of bottom belt which is used to accelerate granular product at a reduced angle prior to being squeezed between dual belt conveyor. Again, however, improvements are needed because:

1. Angle is fixed limiting use of conveyor to angle of repose of granular product on the elongated leg.
2. Efficiency of conveyor is dependent on angle of repose of product, changes by product conveyed.
3. Efficiency of conveyor is also dependent on success of top belt to squeeze product as angle of incline is increased.

Therefore, an object of the present invention is to provide an improved gripping intake system for use with a dual belt conveyor.

Another object of the present invention is to provide an improved gripping intake system for use with a dual belt conveyor which includes a hopper which feeds the granular product into the gap between the upper and lower loop belts which allows the belts themselves to accelerate the product prior to sandwiching of the product between the belts within the dual belt conveyor.

Another object of the present invention is to provide an improved gripping intake system for use with a dual belt conveyor which includes a plurality of hold down rollers which hold the lower loop belt in spaced apart configuration from the upper loop belt in order to provide an entry chute into the gripping intake system for the granular product.

Another object of the present invention is to provide an improved gripping intake system for use with a dual belt conveyor which will quickly and safely accelerate granular product to the approximate speed of the upper and lower loop belts to facilitate intake of the granular product into the dual belt conveyor.

Finally, an object of the present invention is to provide improved gripping intake system for use with a dual belt conveyor which is relatively simple and durable in construction and is safe, efficient and effective in use.

SUMMARY OF THE INVENTION

The present invention provides, in combination, a dual belt conveyor having a flexible endless lower loop belt having a conveying section and a return section, a flexible endless upper loop belt having a conveying section and a return section, the lower loop belt and the upper loop belt arranged with adjacent portions of the conveying sections in face-to-face conveying relationship, a belt drive device for moving the lower and upper loop belts at the same speed and a trough structure supporting the adjacent portions of the conveying sections of the lower loop belts and the upper loop belts and biasing the upper loop belt towards the lower loop belt thereby retaining granular product therebetween through the length of the adjacent portions of the conveying sections of the upper and lower loop belts, and a gripping intake system operatively associated with the dual belt conveyor. The gripping intake system includes a hopper above and adjacent to the return sections of at least one of the upper belt loop and the lower belt loop, an upper loop belt tail roller operative to rollably support the upper loop belt between the conveying section and the return section and at least one hold down roller operative to rollably support the lower loop belt between the return section and the conveying section. The tail roller and the at least one hold down roller retain the upper and lower loop belts in spaced apart configuration prior to the adjacent portions of the conveying sections of the upper and lower loop belts being biased towards one another in face-to-face conveying relationship. Finally, the return sections of at least one of the upper and lower loop belts are operative to engage granular material held within the hopper, accelerate the granular material via gravity and periodic engagement of the granular material with at least one of the upper and lower loop belts and the adjacent accelerated granular material as the upper loop belt passes over the tail roller and the lower loop belt passes under the at least one hold down roller to approximately the speed of the lower and upper loop belts and feed the accelerated granular material into the adjacent portions of the conveying sections of the upper and lower loop belts whereby the granular material is efficiently fed into the face-to-face conveying relationship section of the dual belt conveyor.

By redesigning the return pathways of the two belts in a dual belt system, a "Gripping Intake" can be obtained that will positively control the granular product that enters the dual belt system. A key component of the Gripping Intake is to position the tail rollers of the returning top and bottom belts in a manner to allow gravity to force the granular product between the belts and allow the belts to grip the product as the belts progress into the dual belt system. For high speed dual belt conveyor systems, placing the granular product on the returning top belt prior to the gripping intake will improve the time needed for the granular product to equal the speed of the dual belts as they enter the dual belt system. By using gravity and the returning belts, the gripping intake system of the present invention will have similar performance with little change due to the angle of the conveyor or the angle of repose of the granular product.

It is believed that the gripping intake system of the present invention will have the following advantages:

1. Provide consistent conveying of granular product even as the angle of conveyor increases.
2. Provide consistent conveying even with products with different angle of repose.
3. Allow for simpler drive mechanism to accelerate product.
4. Improved product control with less product escaping system as product is gripped through the system
5. Fixed intake structure simplifies engineering of center of gravity to make conveyor portable.
6. Fixed intake structure simplifies engineering to drive unit from front of tail pulleys.
7. Fixed intake structure allows easy attachment of truck unloading conveyor that can pivot around intake.

The fixed structure of the gripping intake system will also effectively allow the dual belt conveyor to be a portable conveyor. A tractor can be attached to the front of the conveyor and a drive line can be engineered to power the conveyor. An additional swing-around truck unloading conveyor attached to the top of the gripping intake system will allow the dual belt conveyor to be a complete portable system conveying directly from truck to bin. It is thus seen that the gripping intake system of the present invention provides numerous advantages over those devices found in the prior art.

DESCRIPTION OF THE PREFERRED EMBODIMENT

In overview, granular product lands in hopper inside the vertical guide plates and above both tail rollers. Gravity then pulls the granular product down between the tail rollers. The series of hold down rollers keep the bottom belt a set distance away from the top belt tail roller. Gravity, the downward angle and speed of the bottom belt, and the speed and gripping action of the top belt accelerate the granular product. The granular product is then gripped between the two belts and the velocity of the product quickly equals the speed of the belts. To ensure both belts are gripping the granular product, the distance between the belts is continuously controlled as the granular product progresses around the top belt tail roller and enters the transition of the dual belt conveyor. The volume of granular product held between the belts and the guide plates inside the hold down rollers is proportional to volume of granular product held between belts as the product progresses through the dual belt system.

Figure 4:
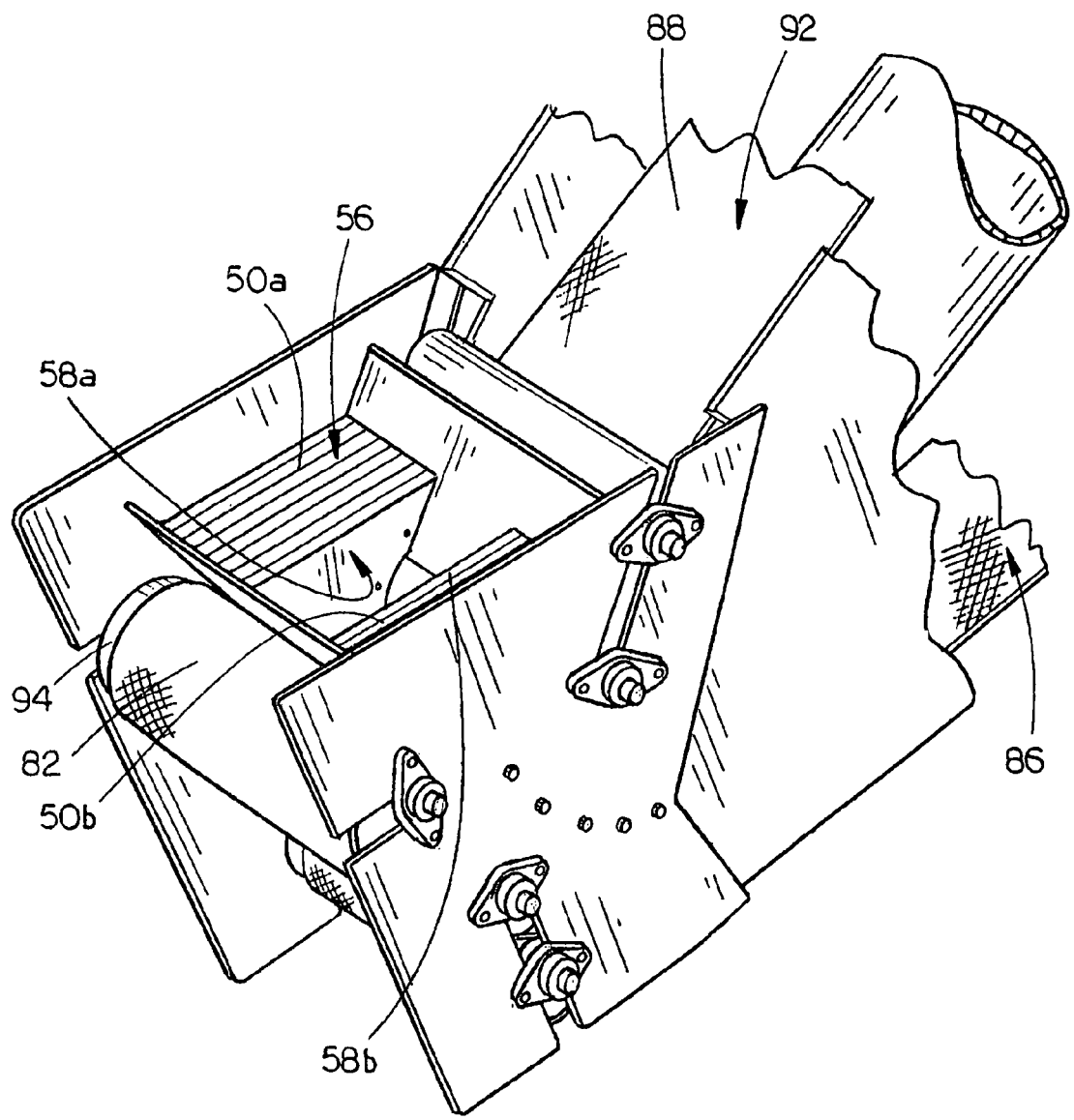
FIG. 4 is a detailed perspective view of the initial intake portion of the present invention.
Figure 5:
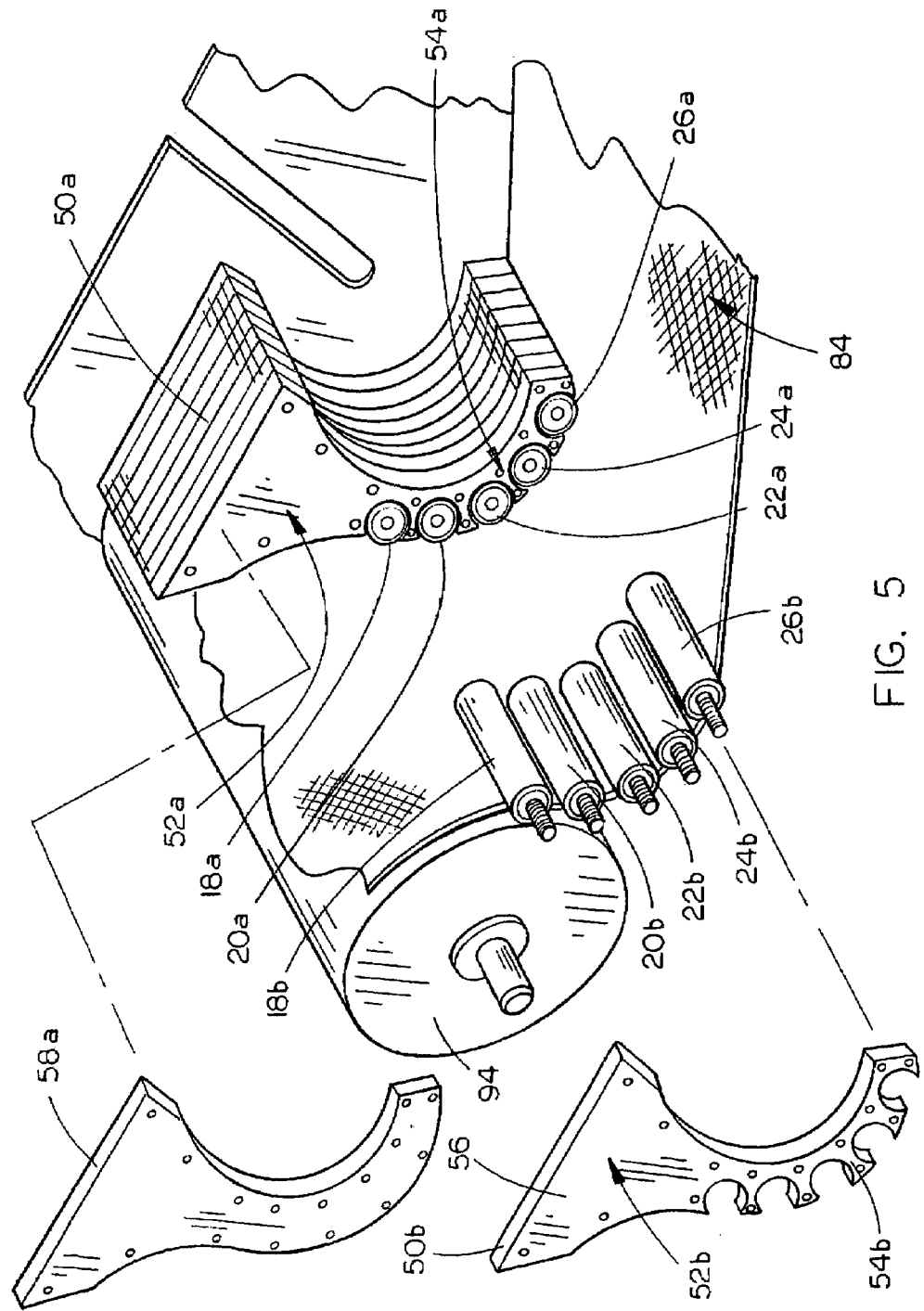
FIG. 5 is an exploded detail perspective view of the hold down rollers and protective plastic shield/cover used thereon.
Figure 6:
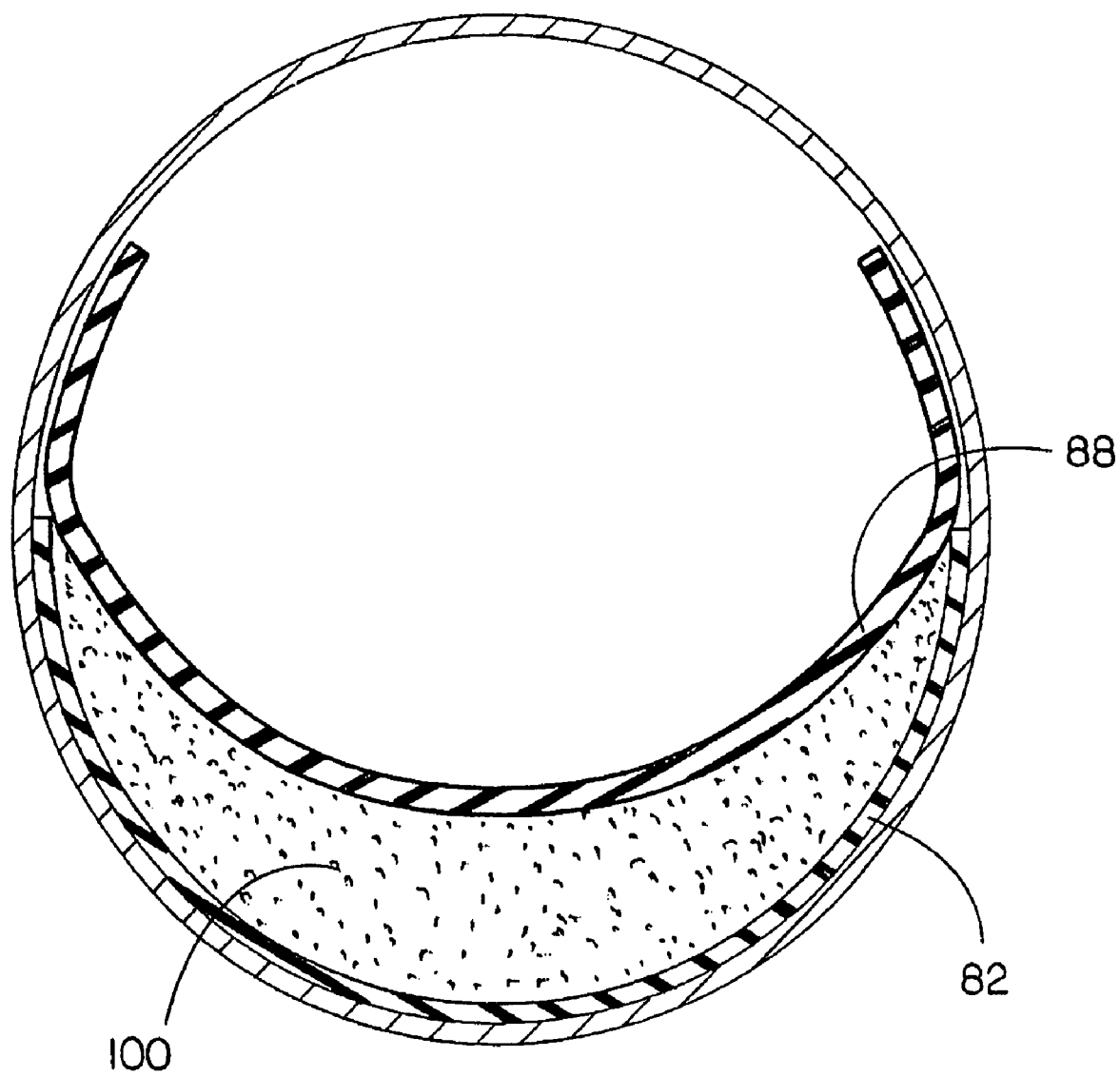
FIG. 6 is a partial detail front elevational view of the belts of the dual conveyor belt system with which the present invention is to be used.
Figure 7:
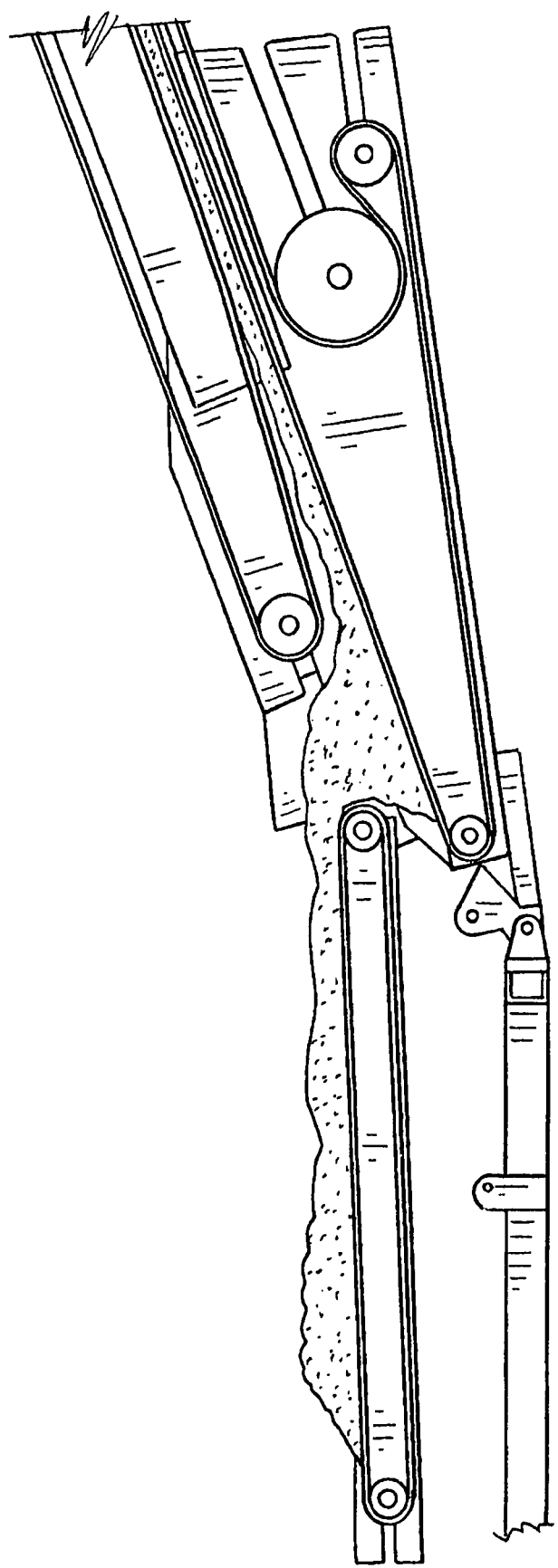
FIGS. 7 and 8 are side elevational views of granular material accelerating devices found in the prior art.
Figure 8:
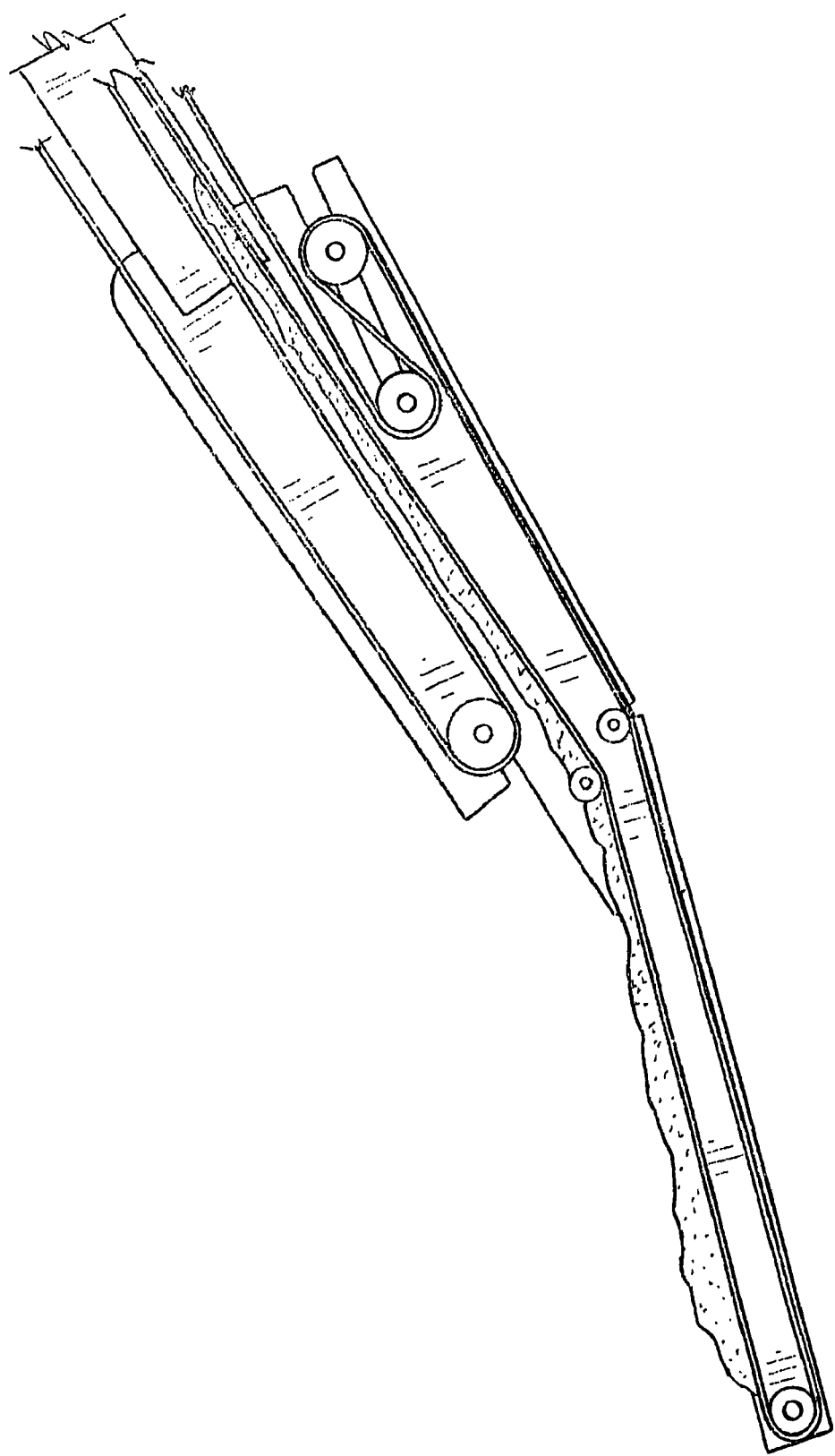

The gripping intake system 10 of the present invention is best shown in FIGS. 1-5 as being connected to the forward end of a dual conveyor belt system of the kind known in the art. Generally, as shown best in FIG. 3, these dual conveyor belt systems 80 include a flexible endless lower loop belt 82 having a conveying section 84 and a return section 86 and a flexible endless upper loop belt 88 having a conveying section 90 and a return section 92. The lower loop belt 82 and the upper loop belt 88 are preferably arranged with adjacent portions of the conveying sections 84 and 90 in face-to-face conveying relationship for "sandwiching" granular product 100 therebetween, as shown in FIG. 6, and a power takeoff 60 is provided to drive the gearbox 62 which is connected via drive chains 64 and 66 to the lower and upper loop belts 82 and 88, thus driving the belts at the same speed. The lower and upper loop belts 82 and 88 would be housed within a trough structure which, in the preferred embodiment, would be a hollow tube which supports the adjacent portions of the conveying sections of the 84 and 90 of lower loop belt 82 and upper loop belt 88 which also biases the upper loop belt 88 towards the lower loop belt 82 thereby retaining the granular product 100 therebetween through the length of the adjacent portions of the conveying sections 84 and 90 of the upper and lower loop belts 88 and 82.

The specific details of the dual conveyor belt system 80, however, are not critical to the present invention, as the modifications to the intake end of the dual conveyor belt system 80 may be performed on many different types of dual conveyor belt systems so long as they generally conform to the description provided previously. Specifically, so long as there are upper and lower loop belts 88 and 82 which can be modified to accommodate the elements of the present invention, the present invention can be used to facilitate entry of the granular product 100 into the dual conveyor belt system 80.

The gripping intake system 10 includes outer frame plates 12a and 12b which are mounted on opposite sides of the intake end of the dual conveyor belt system 80 which provide structural support for the various elements of the system and would be constructed of steel plate for strength. In the preferred embodiment, the distance between the outer frame plates 12a and 12b would be determined by the width of the lower loop belt 82 when it passes between the outer frame plates 12a and 12b, although the exact distance between the plates is not critical to the present invention.

Figure 1:
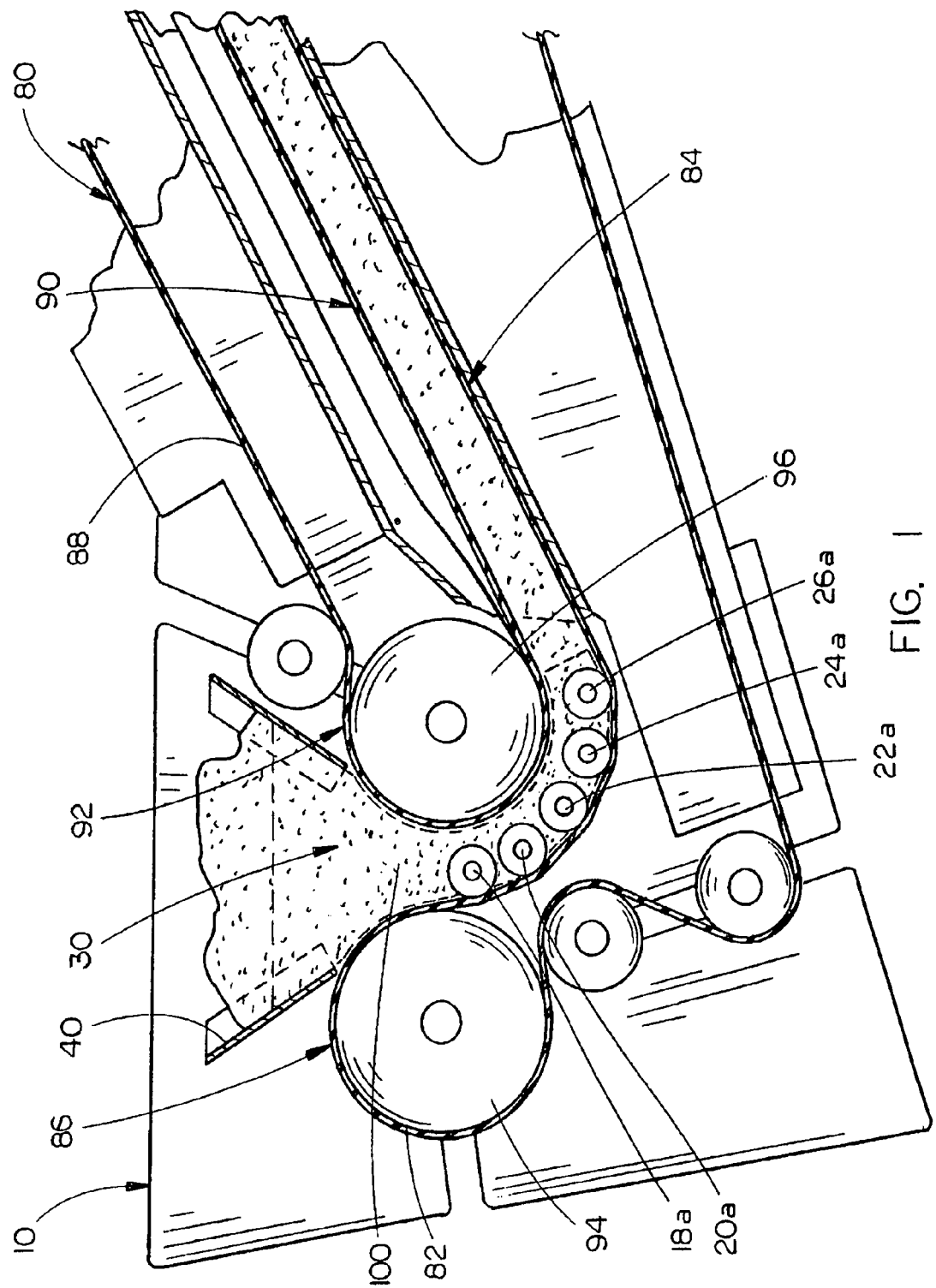
FIG. 1 is a detailed side elevational view of the gripping intake system of the present invention showing the internal features thereof.
Figure 2:
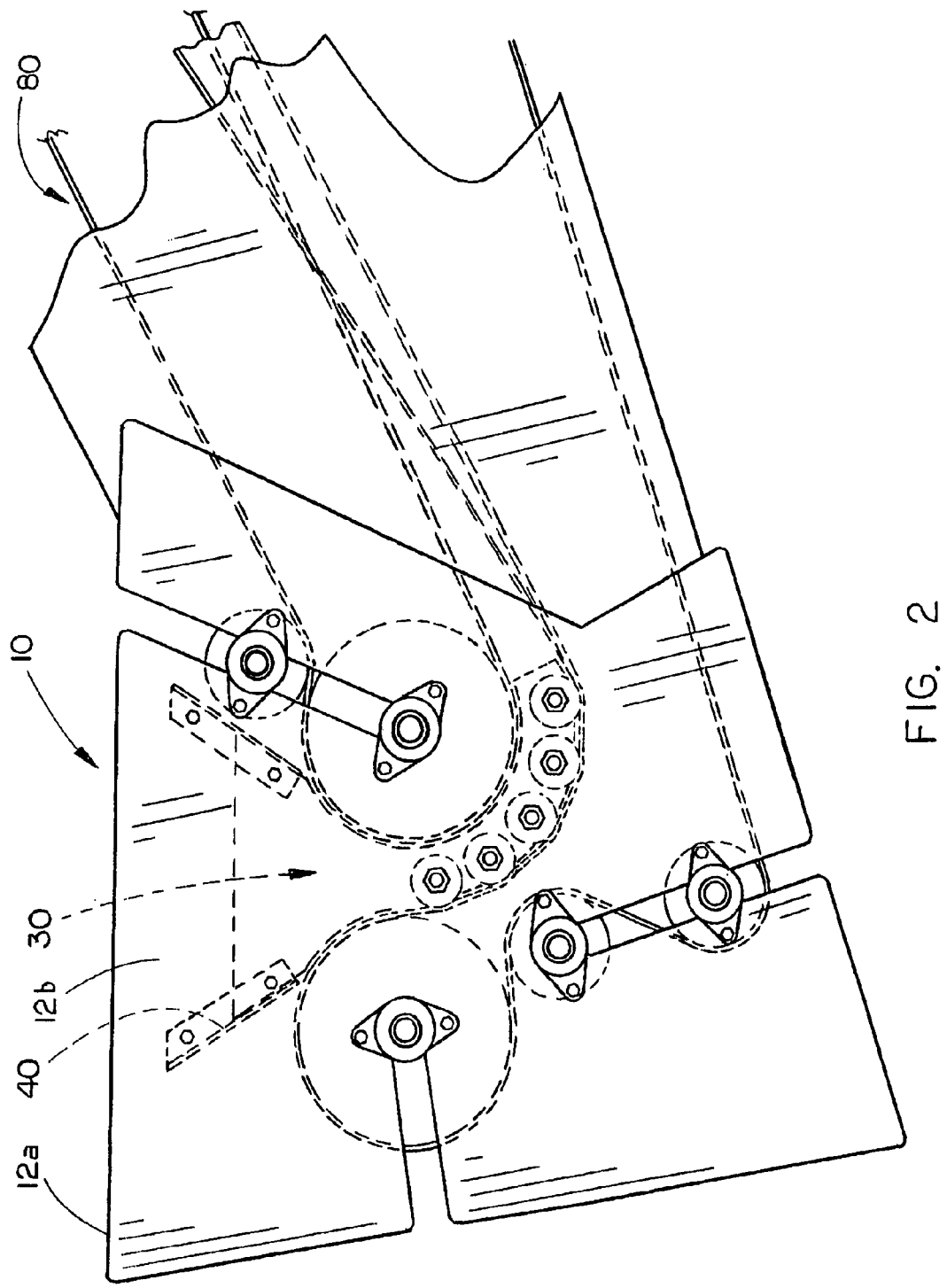
FIG. 2 is a side elevational view of the present invention.
Figure 3:
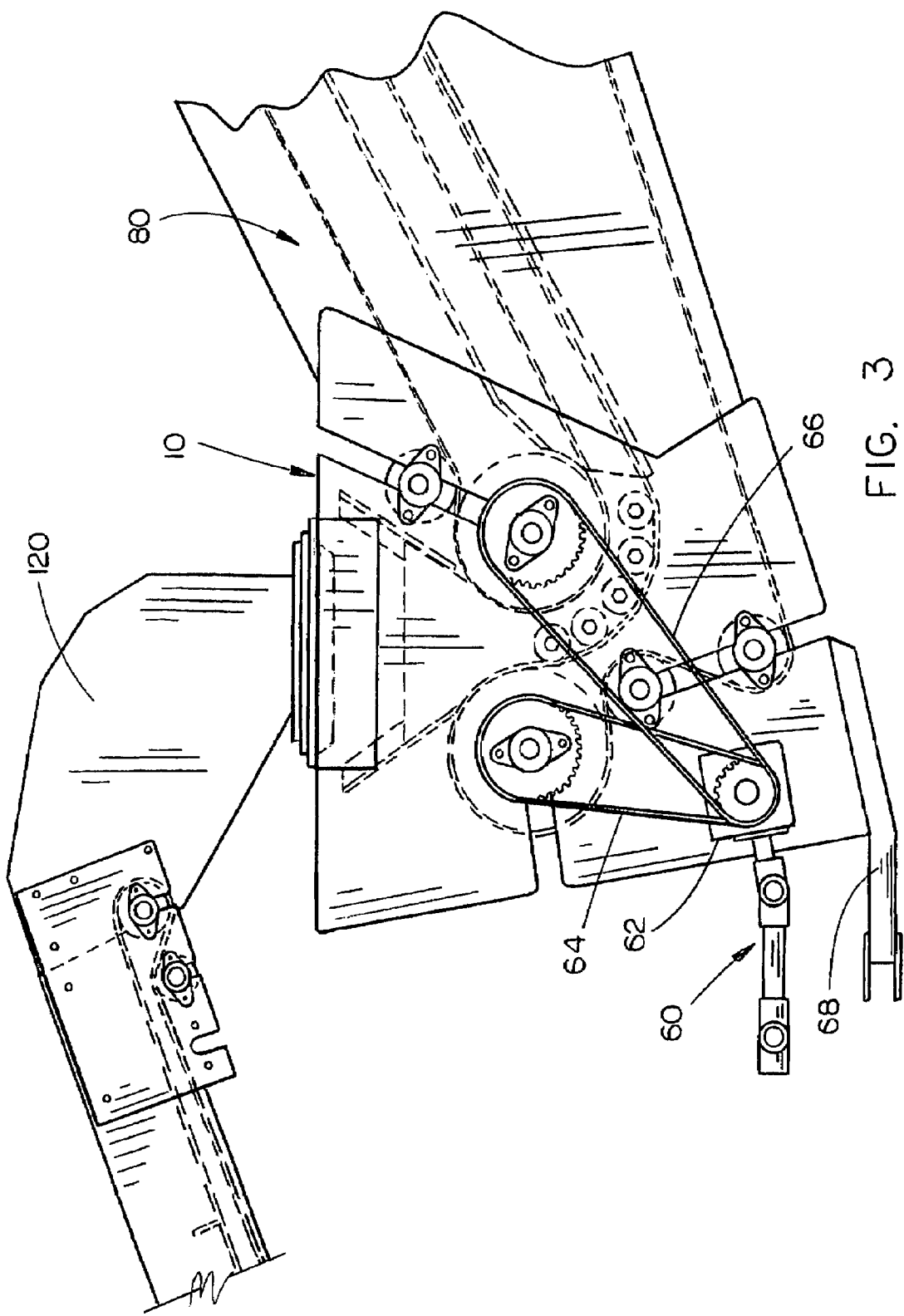
FIG. 3 is a side elevational view of the present invention showing the drive mechanisms and other features thereof.

The upper loop belt 88 passes around an upper tail roller 96 rotatably mounted on and extending between the outer frame plates 12a and 12b and the lower loop belt 82 likewise passes around a rotatably mounted lower tail roller 94 as each of the belts transitions from the return sections 86 and 92 to the conveying sections 84 and 90, and one or more idler pulleys may be included to properly tension the upper loop belt 88 and lower loop belt 82. Of course, the exact number and positioning of the idler pulleys will be determined by the manufacturer of the present invention based on the materials and loads to be carried by the dual conveyor belt system 80. As the upper loop belt 88 passes around a tail roller 96 and the lower loop belt 82 passes around a tail roller 94, the upper and lower loop belts 88 and 82 are positioned in spaced apart proximity as shown in FIGS. 1-3 and in combination with the outer frame plates 12a and 12b, an intake chute 30 is formed into which the granular material 100 may be dumped from a hopper 40 or the like which feeds the granular material into the intake chute 30. In the preferred embodiment, the upper loop belt 88 and lower loop belt 82 would be positioned approximately three to six inches apart which provides an intake chute 30 of sufficient capacity for most purposes.

As the upper and lower loop belts 88 and 82 transition to their upwardly sloped orientation, as shown in FIGS. 2-4, it is critical to maintain spacing of the upper and lower loop belts 88 and 82 from one another so that granular material falling into the intake chute 30 may be gradually accelerated via gravity and frictional contact with one or both of the upper and lower loop belts 88 and 82 and the adjacent accelerated granular material. Therefore, the present invention provides a plurality of hold down rollers 18a, 18b, 20a, 20b, 22a, 22b, 24a, 24b, 26a and 26b which are mounted on the outer frame plates 12a and 12b and extend generally horizontally inwards from opposite sides of the intake chute 30, as shown best in FIGS. 4 and 5. The hold down rollers 18a, 18b, 20a, 20b, 22a, 22b, 24a, 24b, 26a and 26b preferably are arranged in an arc such that each of the rollers engage, bend and conform the lower loop belt 82 into an arcuate configuration which is generally parallel with the arc of the upper loop belt 88 as it passes around the upper tail roller 96 such that the perpendicular spacing between the generally parallel upper and lower loop belts 88 and 82 remains generally constant, although it may be preferable to progressively narrow the distance between the upper and lower loop belts 88 and 82 depending on the type of granular material 100 being accelerated within the present invention.

As there is a granular material flow gap between the left side hold down rollers 18a, 20a, 22a, 24a and 26a and the right side hold down rollers 18b, 20b, 22b, 24b and 26b, the granular material 100 generally will flow between the upper and lower loop belts 88 and 82 and the hold down rollers 18a, 18b, 20a, 20b, 22a, 22b, 24a, 24b, 26a and 26b, and due to the force of gravity on the granular material 100 and the frictional contact with the upper and lower loop belts 88 and 82 and the adjacent accelerated granular material, the majority of the granular material 100 is accelerated to the speed of the upper and lower loop belts 88 and 82. However, it is quite likely that smaller pieces of granular material will possibly fall into one or more of the hold down rollers 18a, 18b, 20a, 20b, 22a, 22b, 24a, 24b, 26a and 26b thus potentially causing degradation of performance of the rollers from the foreign material entering the roller bearings. Therefore, the present invention provides left and right hold down roller shields 50a and 50b which extend upwards above the topmost hold down rollers 18a and 18b out of the intake chute 30 in a topmost flare section 52a and 52b, and which each further include a lower roller engaging section 54a and 54b which fit over each of the hold down rollers 18a, 18b, 20a, 20b, 22a, 22b, 24a, 24b, 26a and 26b. In the preferred embodiment, the left and right hold down roller shields 50a and 50b would be constructed of a highly wear resistant plastic material such as UHMW and may be constructed as single blocks of material which have widths approximately equal to the distance from the outer frame plates 12a and 12b to the inner ends of the hold down rollers 18a, 18b, 20a, 20b, 22a, 22b, 24a, 24b, 26a and 26b, or alternatively the left and right hold down roller shields 50a and 50b may be constructed of a plurality of individual generally planar shield plates 56 which, when assembled together in parallel alignment, would form the completed left and right hold down roller shields 50a and 50b. As shown in FIGS. 4 and 5, the left and right hold down roller shields 50a and 50b, when placed in position within the intake chute 30, protect and cover the hold down rollers 18a, 18b, 20a, 20b, 22a, 22b, 24a, 24b, 26a and 26b from the incoming granular material 100 and further extend almost completely between the upper and lower loop belts 88 and 82 to prevent granular material 100 from unintentionally exiting the intake chute 30 while the granular material 100 is being accelerated. Finally, the left and right hold down roller shields 50a and 50b may include end walls 58a and 58b which cover the inner ends of the hold down rollers 18a, 18b, 20a, 20b, 22a, 22b, 24a, 24b, 26a and 26b to prevent any of the granular material 100 from entering the hold down rollers, and the end walls 58a and 58b would be of the same general size and shape as the individual plates 56 but would not include the hold down roller openings of the lower roller engaging sections 54a and 54b, instead being solid to close and cover the inner ends of the hold down rollers 18a, 18b, 20a, 20b, 22a, 22b, 24a, 24b, 26a and 26b, as shown best in FIG. 5.

As the ends of the left and right hold down roller shields 50a and 50b are reached, the granular material 100 has been accelerated to approximately the same speed as the upper and lower loop belts 88 and 82, and the granular material 100 then enters into the conveying sections 84 and 90 of the upper and lower loop belts 88 and 82 immediately prior to the upper loop belt 88 being biased downwards to engage the granular material 100 which is being carried on the lower loop belt 82. The dual conveyor belt system 80 thus may carry the granular material 100 in its normal operating mode as the granular material 100 has been accelerated to the appropriate speed for efficient engagement of the granular material by the dual conveyor belt system 80.

It is to be understood that numerous modifications, substitutions and additions may be made to the gripping intake system 10 described herein. For example, the exact dimensions, construction materials and functional characteristics of the features described above may be changed or modified. Additionally, the precise arrangement of the features within the gripping intake system 10 and the dual conveyor belt system 80 as described herein may be changed or modified so long as the functionality of the invention is not impaired. Furthermore, the feeding of the granular material 100 into the intake chute 30 may be accomplished by many different methods, including the grain feeder 120 as shown in FIG. 3.

Finally, modification of the size, shape and appearance of the embodiments described herein is expected and will not affect the scope of protection or the specifics of the disclosure contained herein.

There have therefore been shown and described a gripping intake system 10 for a dual conveyor belt system which accomplishes at least all of its intended objectives.

I claim:

1. In combination:
   a dual belt conveyor having a flexible endless lower loop belt having a conveying section and a return section, a flexible endless upper loop belt having a conveying section and a return section, said lower loop belt and said upper loop belt arranged with adjacent portions of said conveying sections in face-to-face conveying relationship, drive means for moving said lower and upper loop belts at the same speed and trough means supporting said adjacent portions of said conveying sections of said lower loop belts and said upper loop belts and biasing said upper loop belt towards said lower loop belt thereby retaining granular product therebetween through the length of the adjacent portions of said conveying sections of said upper and lower loop belts; and
   a gripping intake system operatively associated with said dual belt conveyor, said gripping intake system including;
   intake chute means above and adjacent to said return sections of at least one of said upper belt loop and said lower belt loop;
   an upper loop belt tail roller operative to rollably support said upper loop belt between said conveying section and said return section;
   at least one hold down roller operative to rollably support said lower loop belt between said return section and said conveying section;
   at least one roller shield including a lower roller engaging section which fits over and generally encloses said at least one hold down roller;
   said tail roller and said at least one hold down roller retaining said upper and lower loop belts in spaced apart configuration prior to said adjacent portions of said conveying sections of said upper and lower loop belts being biased towards one another in face-to-face conveying relationship; and
   said return sections of at least one of said upper and lower loop belts operative to engage granular material held within said hopper means, accelerate the granular material via gravity and periodic engagement of the granular material with at least one of said upper and lower loop belts and the adjacent accelerated granular material as said upper loop belt passes over said tail roller and said lower loop belt passes under said at least one hold down roller to approximately the speed of said lower and upper loop belts and feed the accelerated granular material into said adjacent portions of said conveying sections of said upper and lower loop belts whereby the granular material is efficiently fed into said face-to-face conveying relationship section of said dual belt conveyor.

2. The combination of claim 1 further comprising a plurality of generally cylindrical hold down rollers arranged generally parallel with one another, said plurality of hold down rollers arranged in an arc such that each of the rollers engage, bend and conform said lower loop belt into an arcuate configuration which is generally parallel with the arc of said upper loop belt as it passes around said upper loop belt tail roller such that the perpendicular spacing between said upper and lower loop belts remains generally constant.

3. The combination of claim 1 further comprising left and right hold down roller shields each including a topmost flare section extending upwards into said intake chute means and a lower roller engaging section which fits over and generally encloses each of said at least one hold down rollers.

4. The combination of claim 3 wherein said left and right hold down roller shields each include a plurality of individual generally planar shield plates each having generally identical sizes and shapes and which, when assembled together in parallel alignment, form said left and right hold down roller shields.

5. The combination of claim 3 wherein said left and right hold down roller shields each further comprise an end wall operative to cover the inner end of said at least one hold down roller to generally prevent any of the granular material from engaging said at least one hold down roller.

6. A gripping intake system adapted to be operatively associated with a dual belt conveyor having a flexible endless lower loop belt having a conveying section and a return section, a flexible endless upper loop belt having a conveying section and a return section, the lower loop belt and the upper loop belt arranged with adjacent portions of the conveying sections in face-to-face conveying relationship, drive means for moving the lower and upper loop belts at the same speed and trough means supporting the adjacent portions of the conveying sections of the lower loop belts and the upper loop belts and biasing the upper loop belt towards the lower loop belt thereby retaining granular product therebetween through the length of the adjacent portions of the conveying sections of the upper and lower loop belts, said gripping intake system including;
   intake chute means for storing granular material, said intake chute means adapted to be positioned above and adjacent to the return sections of at least one of the upper belt loop and the lower belt loop of the dual belt conveyor;
   at least one hold down roller operative to rollably engage and support the lower loop belt between the return section and the conveying section;
   said at least one hold down roller retaining the lower loop belt in spaced apart configuration from the upper loop belt prior to the adjacent portions of the conveying sections of the upper and lower loop belts being biased towards one another in face-to-face conveying relationship; and
   at least one roller shield including a lower roller engaging section which fits over and generally encloses said at least one hold down roller;
   said intake chute means operative to release granular material therein onto the return sections of at least one of the upper and lower loop belts, the granular material being accelerated via gravity and periodic engagement of the granular material with at least one of the upper and lower loop belts and the adjacent accelerated granular material as the upper loop belt and the lower loop belt are held in spaced apart configuration by said at least one hold down roller to approximately the speed of the lower and upper loop belts and feed the accelerated granular material into the face-to-face conveying relationship section of the dual belt conveyor.

7. The gripping intake system of claim 6 further comprising a plurality of generally cylindrical hold down rollers arranged generally parallel with one another, said plurality of hold down rollers arranged in an arc such that each of the rollers engage, bend and conform the lower loop belt into an arcuate configuration which is generally parallel with the arc of the upper loop belt as it passes around the upper loop belt tail roller such that the perpendicular spacing between said upper and lower loop belts remains generally constant.

8. The gripping intake system of claim 6 further comprising left and right hold down roller shields each including a topmost flare section extending upwards into said intake chute means and a lower roller engaging section which fits over and generally encloses each of said at least one hold down rollers.

9. The combination of claim 8 wherein said left and right hold down roller shields each include a plurality of individual generally planar shield plates each having generally identical sizes and shapes and which, when assembled together in parallel alignment, form said left and right hold down roller shields.

10. The combination of claim 8 wherein said left and right hold down roller shields each further comprise an end wall operative to cover the inner end of said at least one hold down roller to generally prevent any of the granular material from engaging said at least one hold down roller.

11. In combination:
a dual belt conveyor having a flexible endless lower loop belt having a conveying section and a return section, a flexible endless upper loop belt having a conveying section and a return section, said lower loop belt and said upper loop belt arranged with adjacent portions of said conveying sections in face-to-face conveying relationship, drive means for moving said lower and upper loop belts at the same speed and trough means supporting said adjacent portions of said conveying sections of said lower loop belts and said upper ioop belts and biasing said upper loop belt towards said lower loop belt thereby retaining granular product therebetween through the length of the adjacent portions of said conveying sections of said upper and lower loop belts; and
a gripping intake system operatively associated with said dual belt conveyor, said gripping intake system including;
intake chute means above and adjacent to said return sections of at least one of said upper belt loop and said lower belt loop;
an upper loop belt tail roller operative to rollably support said upper loop belt between said conveying section and said return section;
a plurality of hold down rollers operative to rollably support said lower loop belt between said return section and said conveying section, said plurality of hold down rollers arranged in an arc such that each of the rollers engage, bend and conform said lower loop belt into an arcuate configuration;
said tail roller and said plurality of hold down rollers retaining said upper and lower loop belts in spaced apart and generally parallel configuration such that the perpendicular spacing between said upper and lower loop belts remains generally constant prior to said adjacent portions of said conveying sections of said upper and lower loop belts being biased towards one another in face-to-face conveying relationship;
at least one roller shield including a lower roller engaging section which fits over and generally encloses said hold down roller; and
said return sections of at least one of said upper and lower loop belts operative to engage granular material held within said hopper means, accelerate the granular material via gravity and periodic engagement of the granular material with at least one of said upper and lower loop belts and the adjacent accelerated granular material as said upper loop belt passes over said tail roller and said lower loop belt passes under said at least one hold down roller to approximately the speed of said lower and upper loop belts and feed the accelerated granular material into said adjacent portions of said conveying sections of said upper and lower loop belts whereby the granular material is efficiently fed into said face-to-face conveying relationship section of said dual belt conveyor.

12. The combination of claim 11 further comprising left and right hold down roller shields each including a topmost flare section extending upwards into said intake chute means and a lower roller engaging section which fits over and generally encloses each of said at least one hold down rollers.

13. The combination of claim 12 wherein said left and right hold down roller shields each include a plurality of individual generally planar shield plates each having generally identical sizes and shapes and which, when assembled together in parallel alignment, form said left and right hold down roller shields.

14. The combination of claim 12 wherein said left and right hold down roller shields each further comprise an end wall operative to cover the inner end of said at least one hold down roller to generally prevent any of the granular material from engaging said at least one hold down roller.

* * * * *